April 8, 1930.  M. E. CHENEY  1,753,917
ELECTRIC INDICATING INSTRUMENT
Filed Feb. 29, 1928  2 Sheets-Sheet 1
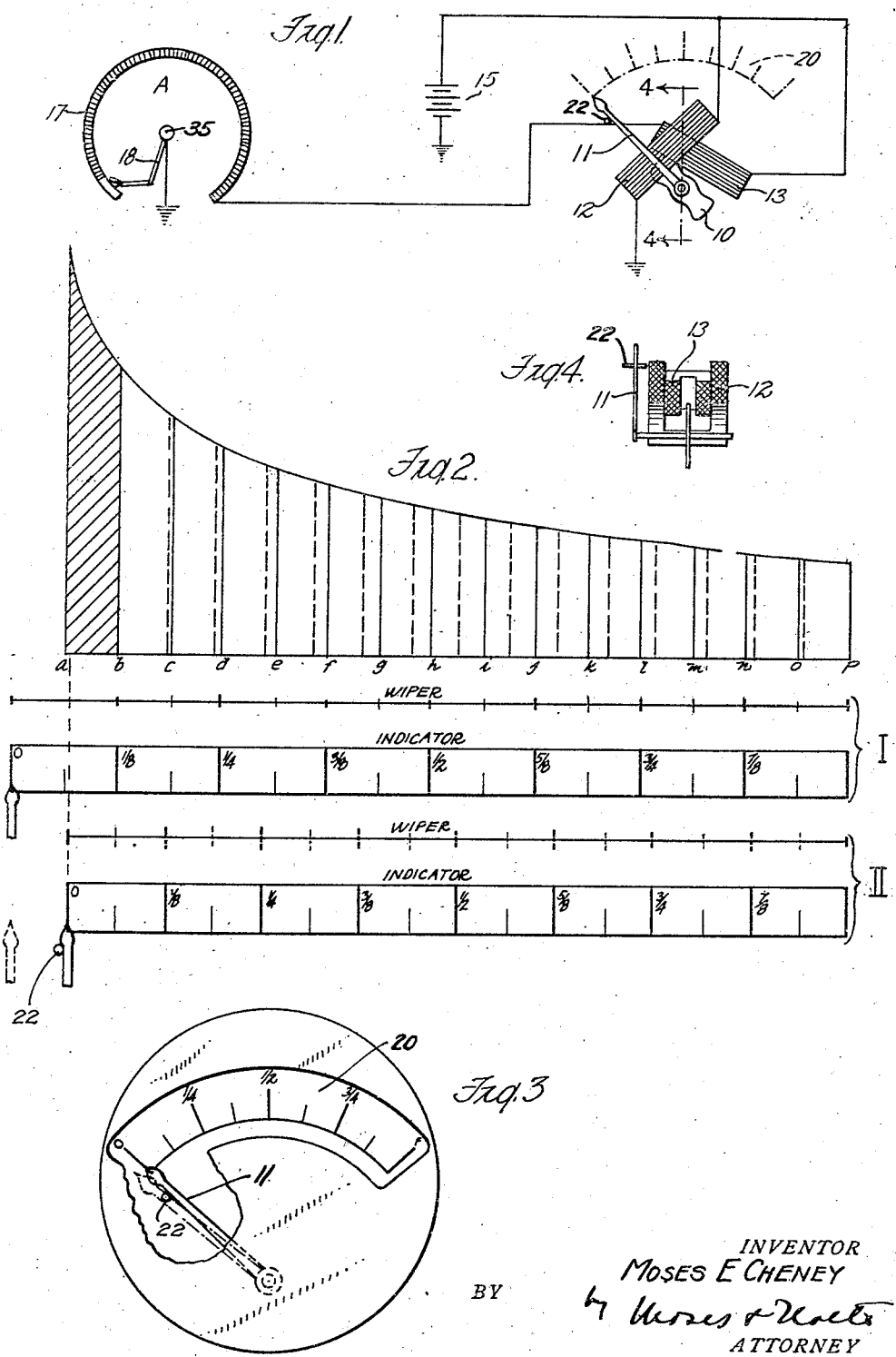
INVENTOR
MOSES E CHENEY
BY
ATTORNEY April 8, 1930. M. E. CHENEY 1,753,917
ELECTRIC INDICATING INSTRUMENT
Filed Feb. 29, 1928  2 Sheets-Sheet 2
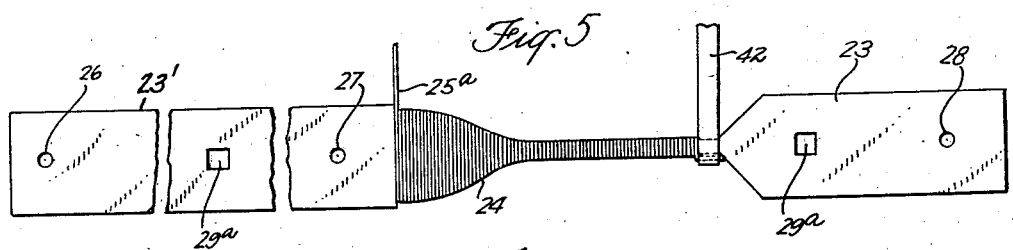
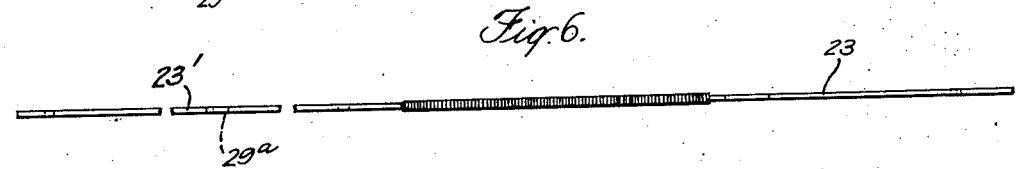
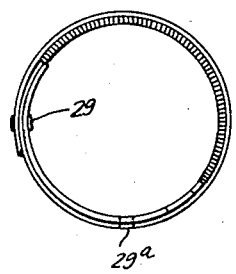
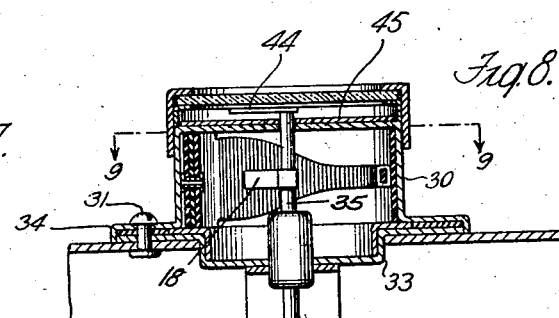
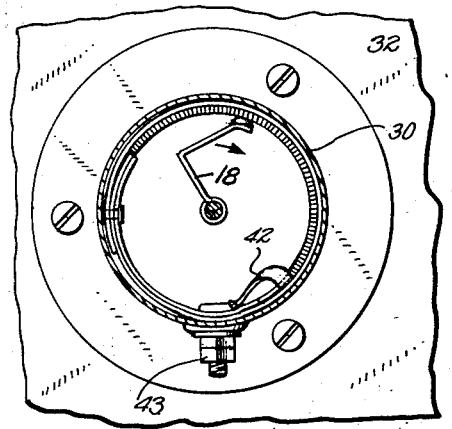
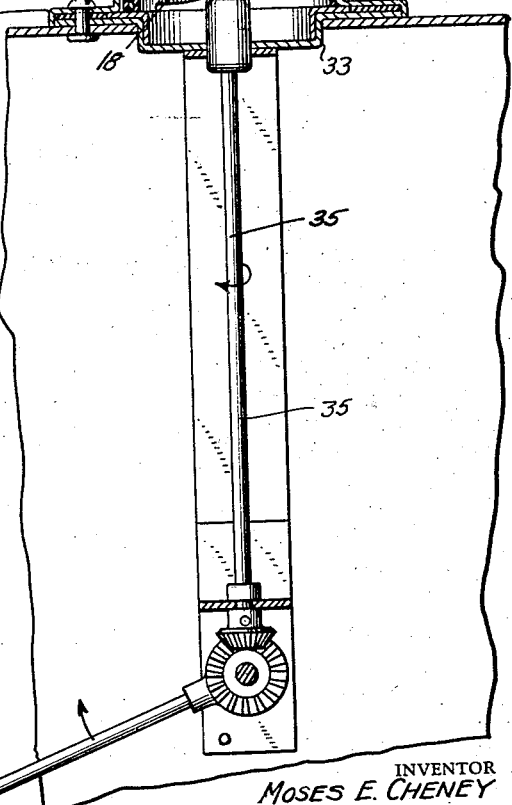
INVENTOR
MOSES E. CHENEY
BY
ATTORNEY Patented Apr. 8, 1930

1,753,917

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

ELECTRIC INDICATING INSTRUMENT

Application filed February 29, 1928. Serial No. 257,816.

This invention relates to electric liquid level measuring instruments suitable for use particularly as gasoline gauges for the modern automobile and similar conveyances, wherein a liquid level receptacle is placed at one point and an indicator at a distance therefrom. As explained fully in the co-pending application Serial No. 290,173, there were a large number of requirements which has made it difficult to construct a satisfactory electric gas gauge.

Briefly, the use of a battery and a generator in the same circuit necessitated the use of a differentially wound indicating instrument. The complicated character of the electric wiring used on automobiles made it desirable to simplify the extra wiring and connections for the gauge. The character of the tank fitting demanded a rheostat that could be readily fitted within said housing, and another restriction was due to the fact that the manufacturers and users were accustomed to a scale range for the indicator point of not less than 60 degrees and furthermore the graduations should be uniform throughout the scale range. These requirements, together with the item of cost, led to the adoption of the cross-coil instrument having one coil connected across the battery and generator and the other coil in series with the strap resistor fully described and claimed in said application.

The object of this invention is to further simplify the construction by suppressing part of the scale range of the indicator shown and described in said application Ser. No. 290,173. This was accomplished by positioning the coils at such a predetermined angle in their relation one to the other as to give a scale range of sufficient length to enable a part of the scale to be suppressed without reducing the scale beyond the minimum amount required by the manufacturer and user.

It is explained in the co-pending application Serial No. 290,173 that in this cross-coil apparatus the curve of resistances applied at full position, ¾, ½, ¼, ⅛ and $\frac{1}{16}$ of the liquid receptacle is of somewhat different character than the curve of resistances required for the same tank readings when using a D'Arsonval galvanometer or any standard form of compensating instrument having the scale characteristics of the D'Arsonval galvanometer. For one thing, the curve of resistances required for the cross coil instrument is much reduced in curvature and only somewhat resembles a hyperbola. In order further to simplify the winding of the resistance element and reduce the cost and labor thereof, as well as insure that the turns of wire will remain positioned on the base, as wound, it is desirable to dispense with the parts of the curve where the curvature is greatest, to wit:—that portion at least which normally would correspond to the portion of the scale between zero and $\frac{1}{16}$ full. In other words, by confining the scale range of the pointer to the flatter portion of the curve, a simpler and better resistance element can be used.

For this reason this invention proposes a stop for limiting the reversing movement of the indicator pointer to a point removed from the zero position, e. g. the $\frac{1}{16}$ full position, combining therewith a scale graduated from zero to full with the zero mark located at the actual $\frac{1}{16}$ full position and an open circuit on the resistor effective at the $\frac{1}{16}$ full position which together enable an undesirable portion of the resistor to be suppressed. This can be satisfactorily done because the coils can be set at such a predetermined angle as to provide for sufficient range to meet the requirement of the manufacturer and user, even though the part of the resistor, and the corresponding lower portion of the instrument scale have been suppressed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a diagrammatic view of the gauge and the connections. Fig. 2 is a graph illustrating the curve of resistances for various positions of the liquid level, the Parts I II of said figure illustrating the wiper and indicator graduations before and after the suppression of the scale range. Fig. 3 is an elevation of the indicator. Fig. 4 is a cross sectional view on lines 4—4 of Fig. 1. Figs. 5 and 6 are detail views of the resistor. Fig. 7 is a plan view of said resistor after being bent to fit within the tank housing. Fig. 8 is a fragmentary sectional view of the tank and fitting with one resistor mounted in the housing. Fig. 9 is a transverse sectional view on lines 9—9 of Fig. 8. Fig. 10 is a detail of the terminal for the tank fitting.

A full description of the rheostat, cross-coil instrument and connections is contained in the co-pending application Serial No. 290,173 and Fig. 1 of this present application shows the cross-coils 12 and 13 connected to a battery or source of current, the armature 10 being pivotally mounted in the open field of said coils and the rheostat 17 in series with said coil 13.

Referring to Figs. 5 to 10 inclusive, I have shown a rheostat including a strap type resistance element comprising a coil of wire and a strip of thin fiber or other suitable insulating material having a generally tapering portion 24, and end portions 23 and 23' adapted to overlap when the strip is bent into circular form as shown in Fig. 7. The tapering portion is of such configuration that, when wound with resistance wire 25$^a$. and connected with the cross coil instrument, the graduations in resistance value will define a curve of somewhat the same shape but generally flatter than the hyperbolic curve. When winding this wire, the end thereof at the large end of the tapering portion of the strip may be the unconnected one and accordingly is bent down and held in place between the overlapping ends of the strip. The other end of the wire is joined to a connector 42 which may be of soft, copper ribbon which connects such end with the terminal 43, which, as shown in Fig. 10, is insulated from the metal cap 30 which is grounded.

Before the wire has been wound upon the strip as indicated in Figs. 5 and 6, the strip has been preferably perforated at 26, 27 and 28 whereupon after the wire has been wound thereon and the strip is coiled to form an annulus as shown in Fig. 7, the perforations 26, 27 and 28 will be brought into registry. An eyelet or rivet 29 is then passed through the perforations and upset, thereby holding the resistance element in its annular form. When mounting the resistance element in the manner shown in Figs. 8 and 9, it will also be necessary to punch a hole 29$^a$ therethrough to accommodate the terminal 43 which is arranged on the side of the cap 30.

This side connection of the terminal is of at least two-fold advantage in that it absolutely insures against the resistance element working loose and rotating slightly which would have the effect of impairing the accuracy thereof. In addition, it enables the shaft 35 to be carried through the top of, and a hand 44 to be arranged thereon which will work in conjunction with an auxiliary scale 45. However, the resiliency of the coil strip taken with the natural adhesive effect of the shellac or other coating is ordinarily sufficient to hold the rheostat element against rotation in its housing cap 30 whereby if desired the terminal 43 may be led through the top of the housing 30 and the auxiliary pointer and scale dispensed with. Mounted on the shaft 35 and within the rheostat housing 30 is a wiper arm 18 the outer end of which cooperates with the resistance element.

Now, referring to Figs. 1 to 4, it will be seen that when the wiper arm reaches a point near the low end of the scale it passes off of the end of the resistance element and, to the lower extreme end of its travel, it moves in contact with the insulating strip, it being shown in Fig. 1 in the latter position. The indicating instrument comprises two cross coils, 12 and 13, one connected across a source of current and the other in series with a C-shaped resistor having closed and open circuit sectors over which moves the float-actuated wiper 18. A pointer 11 actuated by the cross coils cooperates with a scale 20 provided on the indicating instrument. Movement of the pointer in the direction toward the low end of the scale is limited by a stop pin 22. Thus it will be understood that when the wiper engages one extreme end of the resistor the pointer and scale will indicate a "full tank." As the liquid level drops, the wiper will move upon the resistor and the pointer will likewise gradually move toward the "empty" indication of the scale. After the wiper reaches a certain point on the resistor e. g. a point at which the pointer indicates $\frac{1}{16}$ full, the wiper moves on to the open circuit sector of the resistor and immediately the pointer drops into engagement with the stop pin. The scale is so designed that the pointer, when in engagement with the stop pin, points to the zero of the scale. After the pointer comes to rest the float and wiper have a further downward movement independent of the pointer. It is therefore apparent that the pointer and wiper arm no longer move in unison the pointer being held against reverse movement while the wiper may continue to move reversely over said open circuit. In this way the rapidly mounting resistances at the low end of the scale are dispensed with and the pointer is kept from moving below a fixed point which can be marked with the zero mark. This of course shortens the scale range of the pointer, but by arranging the coils in such an angular relation as shown in Fig. 1, the entire scale range of the pointer is sufficiently great to permit a part to be suppressed without reducing the scale beyond the limit required by the manufacturer.

In Fig. 2 there is shown a series of graduations marked I and another series marked II. For convenience both these scales are taken as exactly alike. The showing thus far simply represents a rheostat designed to give 16 equal increments of pointer movement and brings out the fact that the resistance required for causing the pointer to move from "1/8th" to "1/16th" is very large, (the shaded part indicating that increase in resistance) and in the example given would require an additional amount of 280 ohms.

It is a feature of the present invention to obviate the necessity of employing the high resistance increment below the 1/8 position while affording a maximum of indicating movement of the pointer.

Referring to Fig. 2 the resistances from 1/16 to full position are indicated at $a$ to $p$ and in order that one feature of my invention may be understood, let it be supposed that the first resistance increment $a$—$b$ be omitted. In such a case it will be seen that when the wiper first contacts with a resistance element at $b$, an increment of resistance will be made of from infinity to 280 ohms instead of from infinity to 560 ohms and that this new increment of 280 ohms will represent just twice the pointer movement that it otherwise would so that under the conditions given, when the wiper contacts with the resistance element at the position $b$, the pointer will purport to have moved 2/16ths or 1/8th of its travel.

In order to prevent the pointer swinging to a position such that the armature will be substantially in line with the axis of coil 12 (the armature will tend to assume that position because the circuit of coil 13 being open no current can pass through the coil 13), a stop 22 (shown in Figs. 1 and 3) is positioned so the pointer when it reaches the 1/16 position, will contact therewith. In this way the travel of the pointer is limited to the distance from $a$ to $p$, as indicated in II of Fig. 2 instead of having the length of travel indicated in I of Fig. 2. Beneath the line indicating the new indicator travel is the new indicator scale (see II of Fig. 2). It is to be remembered that the two coils are set at such angular relation that what is lost in the travel of the pointer at the low end of the scale is compensated for because the armature has an increased amount of travel due to the two coils being arranged somewhat as indicated in Fig. 1. These coils are adjustably supported as shown in my co-pending application Serial No. 93,806, filed March 10, 1926. A comparison of I and II of Fig. 2 shows that the smaller indicator scale II has been graduated in a way to include all the graduations of the longer scale I by moving the graduations at the low end of the scale towards the high end, beginning with the zero point which is arbitrarily fixed at the 1/16 point of scale I. At the high end of the scale the corresponding points shown at I and II are substantially in line. In this way the gauge is arranged so that the float can move from the position that it assumes when the tank is really empty to a position where sufficient liquid is contained therein to cause the float to rise to floating position or about 1/16 full before the pointer begins to move, and when the wiper 18 does move from the open circuit and makes contact with the wire of the resistance element the pointer will be given a quick, short initial movement from zero to 1/16, having an increment of pointer movement of 1/16 instead of 2/16 as would be required if the stop was omitted, and thereafter throughout its travel the pointer will have a progressively smooth movement due to the character of the rheostat. This clearly appears from Fig. 5 where the rheostat is shown of peculiar shape which makes it suitable as a support for the turns of wire and one that can readily be bent to the proper shape. This form of rheostat is especially advantageous in that its contour can readily be changed to enable the necessary calibration to be made.

It is believed from the foregoing that the application of my invention to an electric gauge instrument of the type for example, used for indicating the depth of gasoline in an automobile tank will be clear.

It is common practise in the art to have the pointer so balanced that it will return to normal or zero position, when the armature is no longer under the influence of the current, hence with such a pointer it will automatically be brought against the stop forming a fixed point from which to calibrate the scale. This also occurs whenever the ignition switch is thrown to open position, it being customary to furnish current to indicators of this type through the ignition switch.

In a general way, it will be seen that there is here disclosed an electric liquid level measuring instrument suitable for use with all kinds of motor conveyances, wherein a generator and battery are connected in the same circuit, the instrument having a suitable scale range with uniform graduations such as demanded by the trade. It furthermore appears that by combining the cross-coil indicating instrument with the strap resistor and suppressing part of the scale range it is possible to simplify the construction of the resistor and still secure a sufficient scale range to meet the present requirements of the motor vehicle trade.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention I claim as new and desire to secure the following combinations and elements, or equivalents thereof, by Letters Patent of the United States:—

1. In an electrical tank content measuring device, a tank, a source of current, a rheostat including a movable element and a resistor of greater resistance per unit of length at the end corresponding to the empty tank position than at the end corresponding to the full tank position, the full tank position corresponding to the low resistance end of the resistor, an indicator including two coils, one connected across the source of current and the other in series with said resistor, a movable element positioned to be actuated by the effect of the coils and a pointer operated by said element and having generally increasing increments of scale movement for equal increments of voltage applied to the coil in series with the resistance, a stop pin for suppressing the natural scale movement of the movable element at the empty tank end of the scale, the intermediate resistances of said resistor being graded to produce uniform indicator pointer movements for equal units of tank measure, and means for moving the movable element of said rheostat in accordance with variation of liquid level in said tank.

2. In a liquid level indicator the combination of a float operated rheostat including a strap-type resistance element having a tapered insulating strip, a coil on said strip, said coil being wound from the narrower part of the strip to the wider part of said strip as far as the turns will remain positioned as wound, and a cooperating wiper arm, the movement of the arm with respect to said resistance being such that the arm passes off of said resistance at a point in its travel adjacent to a limiting float position, with an indicating device, including a coil in series with said resistance, a pointer, a cooperating uniformly graduated scale, and means operated by said coil capable of producing a movement of said pointer from a point beyond one end graduation of the scale to at least the other end scale indication, one current-produced end scale indication being that established by the pointer when the minimum resistance is in series with the indicator, the other current-produced scale indication being established when the maximum resistance is in series with said indicator, means for holding the indicator pointer at the end scale indication adjacent the minimum current-produced scale indication, such end scale indication being established in accordance with the scale values given to the high and low current scale indications.

3. In a liquid level indicator the combination of a float-operated rheostat including a strap-type resistance element having a tapered insulating strip, a coil on said strip, said coil being wound from the narrower part of the strip to the wider part of the strip as far as the turns will remain positioned as wound, and a cooperating wiper arm, the movement of the arm with respect to said resistance being such that the arm passes off of said resistance at a point in its travel adjacent to the lowermost float position, with an indicating device including a coil in series with said resistance, a pointer, a cooperating uniformly graduated scale, and means operated by said coil capable of producing a movement of said pointer from a point below the lowest scale indication to at least the highest scale indication, the maximum scale indication being that which is established by the pointer when the minimum resistance is in series with the indicator, the minimum current-produced scale indication being established when the maximum resistance is in series with said indicator, means for holding the indicator points at a zero point which is established in accordance with the scale values given to the high and low current points.

4. In a liquid level indicator the combination of a float-operated rheostat including a strap-type resistance element having a tapered insulating strip, a coil on said strip, said coil being wound between the narrower part of the strip to the wider part of said strip and a cooperating wiper arm, the movement of the arm with respect to said resistance being such that the arm passes off of said resistance at a point in its travel adjacent to a limiting float position, with an indicating device including, a coil in series with said resistance, a pointer, a cooperating uniformly graduated scale and means operated by said coil capable of producing a movement of said pointer from a point beyond one end graduation of the scale to at least the other end scale indication, one current-produced end scale indication being that established by the pointer when the minimum resistance is in series with the indicator, the other current-produced scale indication being established when the maximum resistance is in series with said indicator, means for holding the indicator pointer at the end scale indication adjacent the minimum current-produced scale indication such end scale indication being established in accordance with the scale values given to the high and low current scale indications.

5. In a liquid level indicator the combination of a float-operated rheostat including a strap-type resistance element having a tapered insulating strip, a coil on said strip, said coil being wound between the narrower part of the strip and the wider part of said strip as far as the turns will remain positioned as wound, and a cooperating wiper arm, the movement of the arm with respect to said resistance being such that the arm passes off of said resistance at a point in its travel adjacent to a limiting float position, with an indicating device including, a coil in series with said resistance, a pointer, a cooperating uniformly graduated scale, and means operated by said coil capable of producing a movement of said pointer from point beyond one end graduation of the scale to at least the other end scale indication, one current-produced end scale indication being that established by the pointer when the minimum resistance is in series with the indicator, the other current-produced scale indication being estabished when the maximum resistance is in series with said indicator, said tapered insulation strip being shaped so that the resistance coils thereon will produce equal increments of pointer movement over the scale for equal increments of wiper arm movement, means for holding the indicator pointer at the end scale indication adjacent the minimum current produced scale indication such end scale indication being established in accordance with the scale values given to the high and low current scale indications.

6. In a liquid level indicator the combination of a float-operated rheostat including a strap-type resistance element having a tapered insulating strip, a coil on said strip, said coil being wound from the narrower part of the strip to the wider part of said strip as far as the turns will remain positioned as wound, and a cooperating wiper arm, the movement of the arm with respect to said resistance being such that the arm passes off of said resistance at a point in its travel adjacent to a limiting float position, with an indicating device including, a coil in series with said resistance, a pointer, a cooperating uniformly graduated scale, and means operated by said coil capable of producing a movement of said pointer from a point beyond one end graduation of the scale to at least the other end scale indication, one current-produced end scale indication being that established by the pointer when the minimum resistance is in series with the indicator, the other current-produced scale indication being established when the maximum resistance is in series with said indicator, means for holding the indicator pointer at the zero scale indication adjacent the minimum current produced scale indication, said zero indication being spaced from the minimum current-produced scale indication an angular distance in accordance with the angular spacings of the remaining scale indications.

In testimony whereof I have affixed my signature to this specification.

MOSES E. CHENEY.